United States Patent
Lin

Patent Number: 5,996,232
Date of Patent: Dec. 7, 1999

[54] TREE PRUNER

[76] Inventor: Thomas Lin, No. 21, Wan Feng Lane, Wan Feng Village, Fu Hsing Hsian, Chang Hua Hsien, Taiwan

[21] Appl. No.: 09/223,777

[22] Filed: Dec. 31, 1998

[51] Int. Cl.⁶ ..................................................... B26B 13/00
[52] U.S. Cl. .............................................. 30/250; 30/249
[58] Field of Search ...................... 30/249–251, 187–190

[56] References Cited

U.S. PATENT DOCUMENTS

| | | | |
|---|---|---|---|
| 1,378,791 | 5/1921 | Johanson | 30/251 |
| 4,442,603 | 4/1984 | Wallace et al. | 30/249 |
| 5,743,018 | 4/1998 | Wang | 30/249 |
| 5,745,998 | 5/1998 | Le et al. | 30/249 |

*Primary Examiner*—Douglas D. Watts
*Attorney, Agent, or Firm*—Browdy and Neimark

[57] ABSTRACT

A tree pruner consists of a fixed tool and a movable tool fastened pivotally with the fixed tool which is fastened at the lower end thereof with the top end of a support rod. The support rod is provided at the bottom end thereof with two handles for controlling the operation of the fixed tool and the movable tool. The movable tool has an action portion and a blade portion. The action portion is provided with a slide slot having a plurality of arcuate grooves. The fixed tool is fastened pivotally with a rocking arm which is provided at the top end thereof with two support arms. One of the two support arms is provided with a tensile spring which is connected with the fixed tool. Other one of the two support arms is provided with a pull cord which is connected with the handles. The rocking arm is fastened pivotally at the midsegment thereof with one end of a connection rod. Other end of the connection rod is movably disposed in the slide slot of the action portion of the movable tool. The pull cord is activated by the two handles such that the rocking arm and the connection rod are actuated so as to cause the movable tool to turn to sever the twig of a tree.

7 Claims, 5 Drawing Sheets ically 5,996,232

TREE PRUNER

FIELD OF THE INVENTION

The present invention relates generally to a gardening implement, and more particularly to a tree pruner.

BACKGROUND OF THE INVENTION

As shown in FIG. 1, a tree pruner 10 of the prior art has an elongated expandable rod 1 which is provided at the top end thereof with a scissors 2 connected with a transmission member 3. The scissors 2 is controlled by a pair of handles 4. The scissors 2 is formed of a fixed blade 201 and a movable blade 202. Such a prior art tree pruner 10 as described above is defective in design in that it can not sever effectively a rough twig in light of the handles 4 which are incapable of providing the scissors 2 with adequate force of application, and that it can sever the rough twig only after several attempts.

SUMMARY OF THE INVENTION

It is therefore the primary objective of the present invention to provide an improved tree pruner capable of severing a rough tree twig effectively.

It is another objective of the present invention to provide an improved tree pruner which can be easily operated without causing a great deal of physical hardship to the operator.

In keeping with the principle of the present invention, the foregoing objectives of the present invention are attained by the tree pruner consisting of a fixed tool and a movable tool fastened pivotally with the fixed tool which is fastened at the lower end thereof with the top end of a support rod. The support rod is provided at the bottom end thereof with two handles for controlling the operation of the fixed tool and the movable tool. The movable tool has an action portion and a blade portion. The action portion is provided with a slide slot having a plurality of arcuate grooves. The fixed tool is fastened pivotally with a rocking arm which is provided at the top end thereof with two support arms. One of the two support arms is provided with a tensile spring which is connected with the fixed tool. Other one of the two support arms is provided with a pull cord which is connected with the handles. The rocking arm is fastened pivotally at the midsegment thereof with one end of a connection rod. Other end of the connection rod is movably disposed in the slide slot of the action portion of the movable tool. The pull cord is activated by the two handles such that the rocking arm and the connection rod are actuated so as to cause the movable tool to turn to sever the twig of a tree.

The foregoing objectives, features, functions, and advantages of the present invention will be more readily understood upon a thoughtful deliberation of the following detailed description of the present invention with reference to the accompanying drawings.

DETAILED DESCRIPTION OF THE INVENTION

Figure 1:
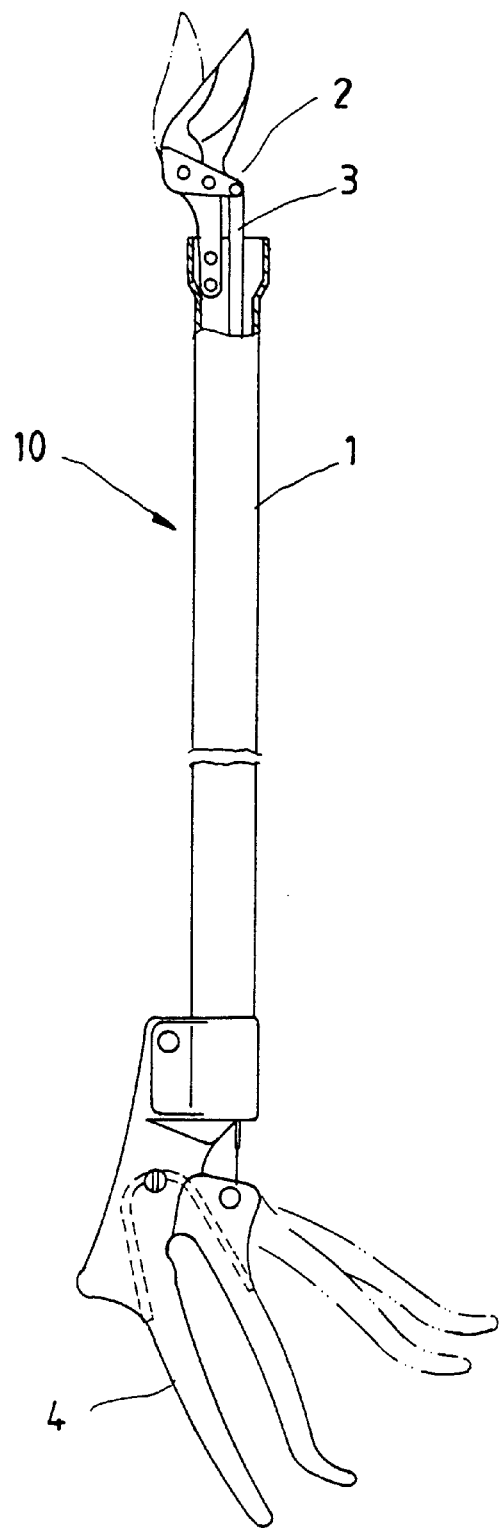
FIG. 1 shows a perspective view of a tree pruner of the prior art.
Figure 2:
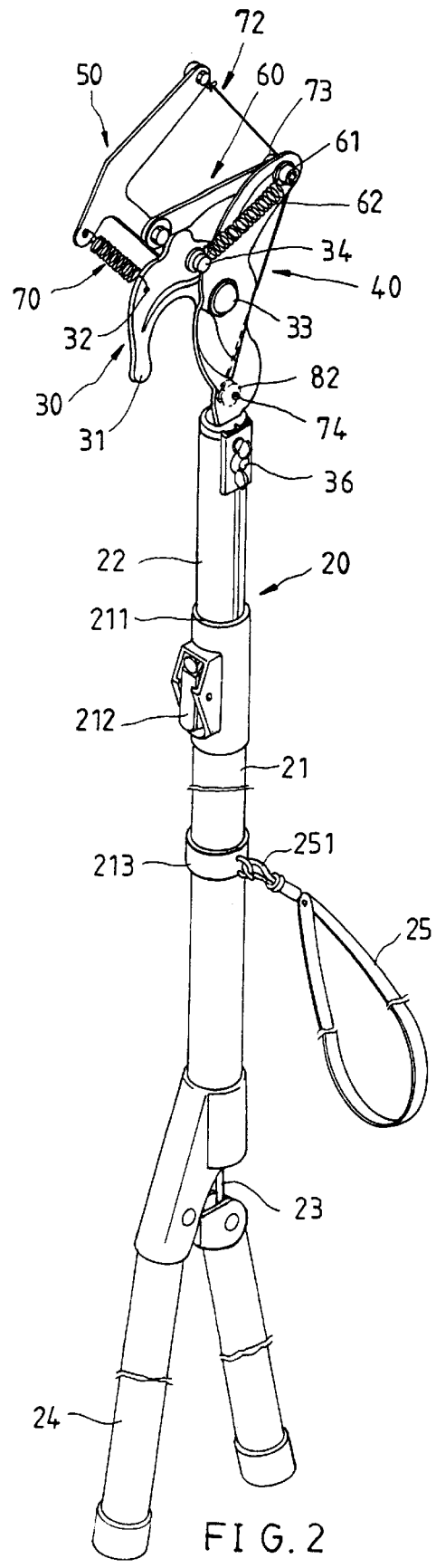
FIG. 2 shows a perspective view of a preferred embodiment of the present invention.
Figure 3:
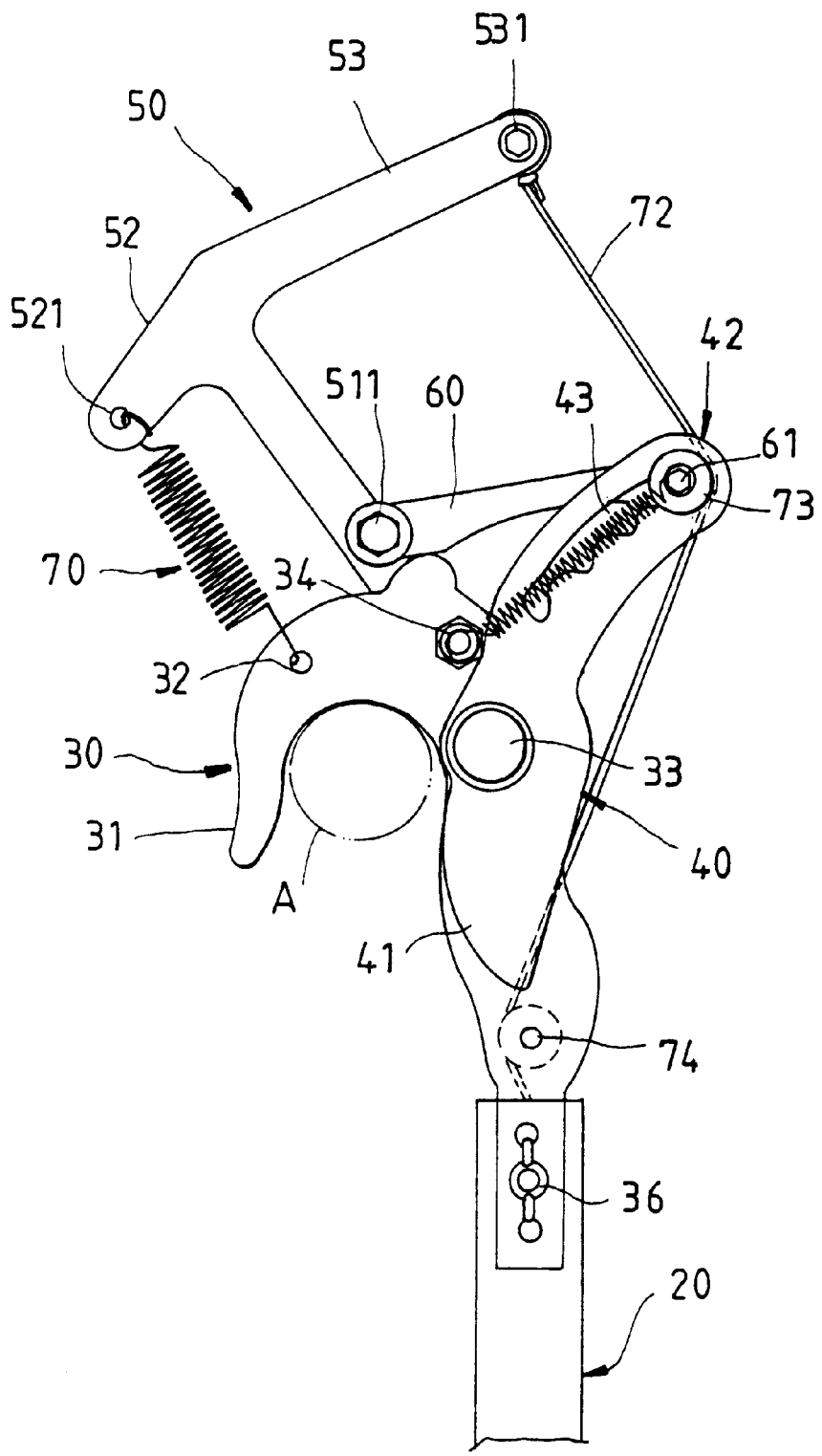
FIG. 3 shows a schematic view of the preferred embodiment of the present invention at work.

As shown in FIGS. 2 and 3, a tree pruner embodied in the present invention is composed of a support rod 20, a fixed tool 30, a movable tool 40, a rocking arm 50, a connection rod 60, a spring 71, a pull cord 72, a first pulley 73, and a second pulley 74.

The support rod 20 is formed of an outer tube 21 and an inner tube 22 which is received in the outer tube 21 such that the inner tube 22 can be extracted from and retracted into the axial hole 211 of the outer tube 21. The outer tube 21 is provided with a locating member 212 for locating the inner tube 22 in the axial hole 211 of the outer tube 21. The axial hole 211 is provided with a force transmission member set 23. The outer tube 21 is provided at one end thereof with two handles 24 which are connected with the force transmission member set 23. The outer tube 21 is provided in the midsegment thereof with a retaining ring 213 which is fastened with a retaining hook 251 of a strap 25 for use in carrying the tree pruner on the back of a worker.

The fixed tool 30 is fastened at the lower end thereof with the top end of the inner tube 22 of the support rod 20 by a fastening member 36 consisting of a nut and a bolt. The fixed tool 30 has a blade 31 which is provided with a through hole 32, a first pivot 33 and a second pivot 34. The blade 31 is provided in the midsegment thereof with a shaft 35 for mounting the second pulley 74.

The movable tool 40 is fastened pivotally with the first pivot 33 of the fixed tool 30 and provided with a blade 41 for severing a tree twig in conjunction with the blade 31 of the fixed tool 30. The movable tool 40 is provided at the lower end thereof with an action portion 42 which is in turn provided with a slide slot 43 of a predetermined length. The slide slot 43 is provided in one side wall thereof with a plurality of arcuate grooves 431. The arcuate grooves 431 and the blade 41 are respectively located at both ends of the first pivot 33. The movable tool 40 is pivoted with the blade 31 of the fixed tool 30 by the first pivot 33.

The rocking arm 50 is of a T-shaped construction and formed of a straight rod 51 and two support arms 52 and 53 extending from the top end of the straight rod 51. The straight rod 51 is fastened pivotally at the bottom end thereof with the second pivot 34 of the fixed blade 30. The straight rod 51 is provided in the midsegment thereof with a first pivot 511. The first support arm 52 is provided with a through hole 521, whereas the second support arm 53 is provided with a round hole 531.

The connection rod 60 is fastened pivotally at one end thereof with the pivot 511 of the straight rod 51 of the rocking arm 50 and is provided at other end thereof with a spindle 61 which is movably disposed in the slide slot 43 of the movable tool 40 such that the spindle 61 can be retained in the arcuate grooves 431. The first pulley 73 is fastened with one end of the spindle 61. The spindle 61 is fastened at other end thereof with one end of a spring 62 which is in turn fastened at other end thereof with the second pivot 34 of the fixed tool 30.

The spring 71 is a tensile spring, which is engaged at one end thereof with the through hole 521 of the rocking arm 50, and at other end thereof with the through hole 32 of the fixed tool 30. The rocking arm 41 is thus slanted.

The pull cord 72 is put through the round hole 531 of the second support arm 53 of the rocking arm 50 and is then wound on the first pulley 73 and the second pulley 74 before being connected with the force transmission member 23. In light of the first pulley 73 being located behind the spindle 61 of the connection rod 60, the second pulley 74 being located behind the fixed tool 30, and the first pulley 73 and the second pulley 74 being located in the same side, there is no interference at the time when the pull cord 72 is pulled.

Figure 4:
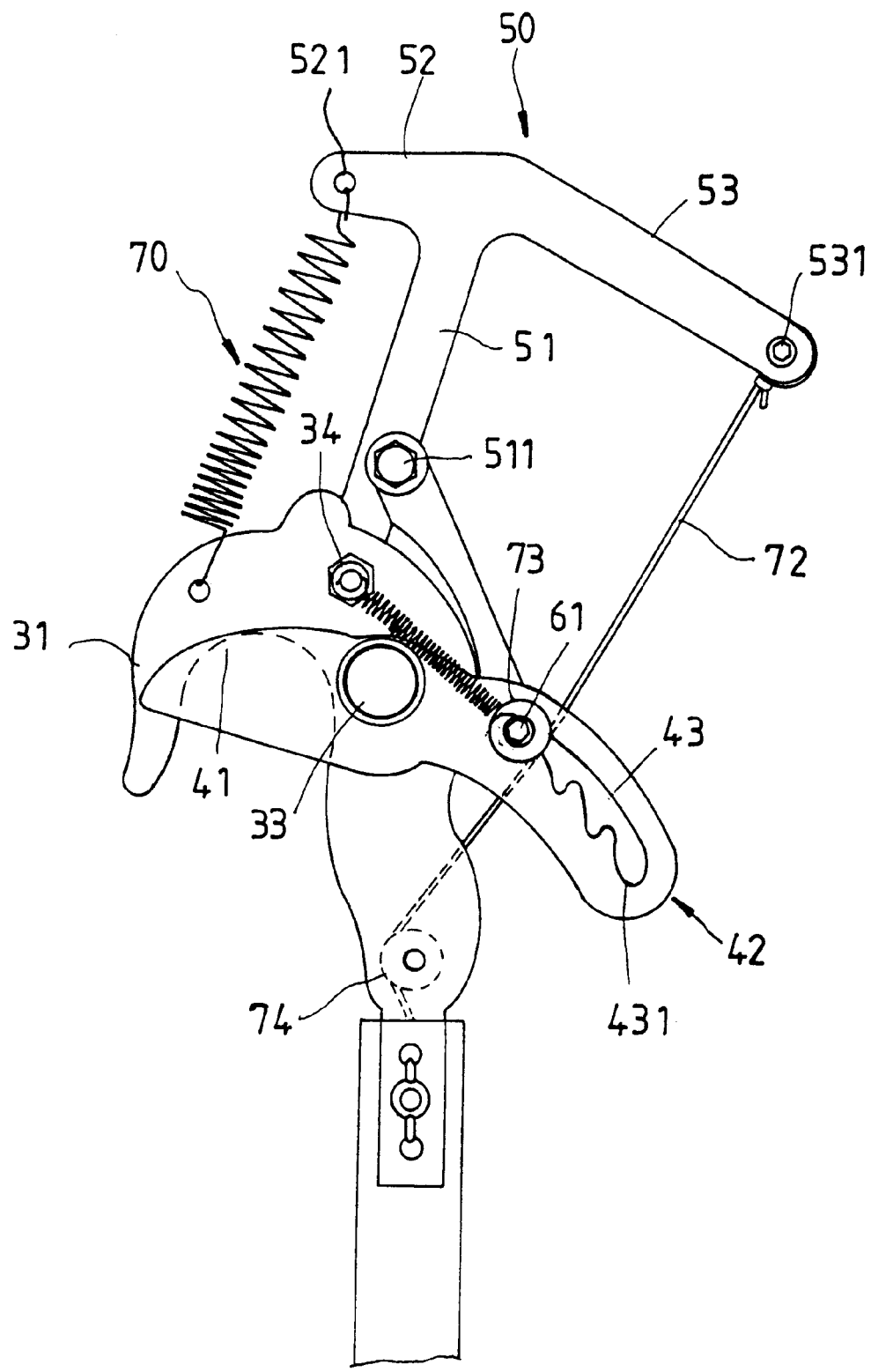
FIG. 4 shows another schematic view of the preferred embodiment of the present invention at work.
Figure 5:
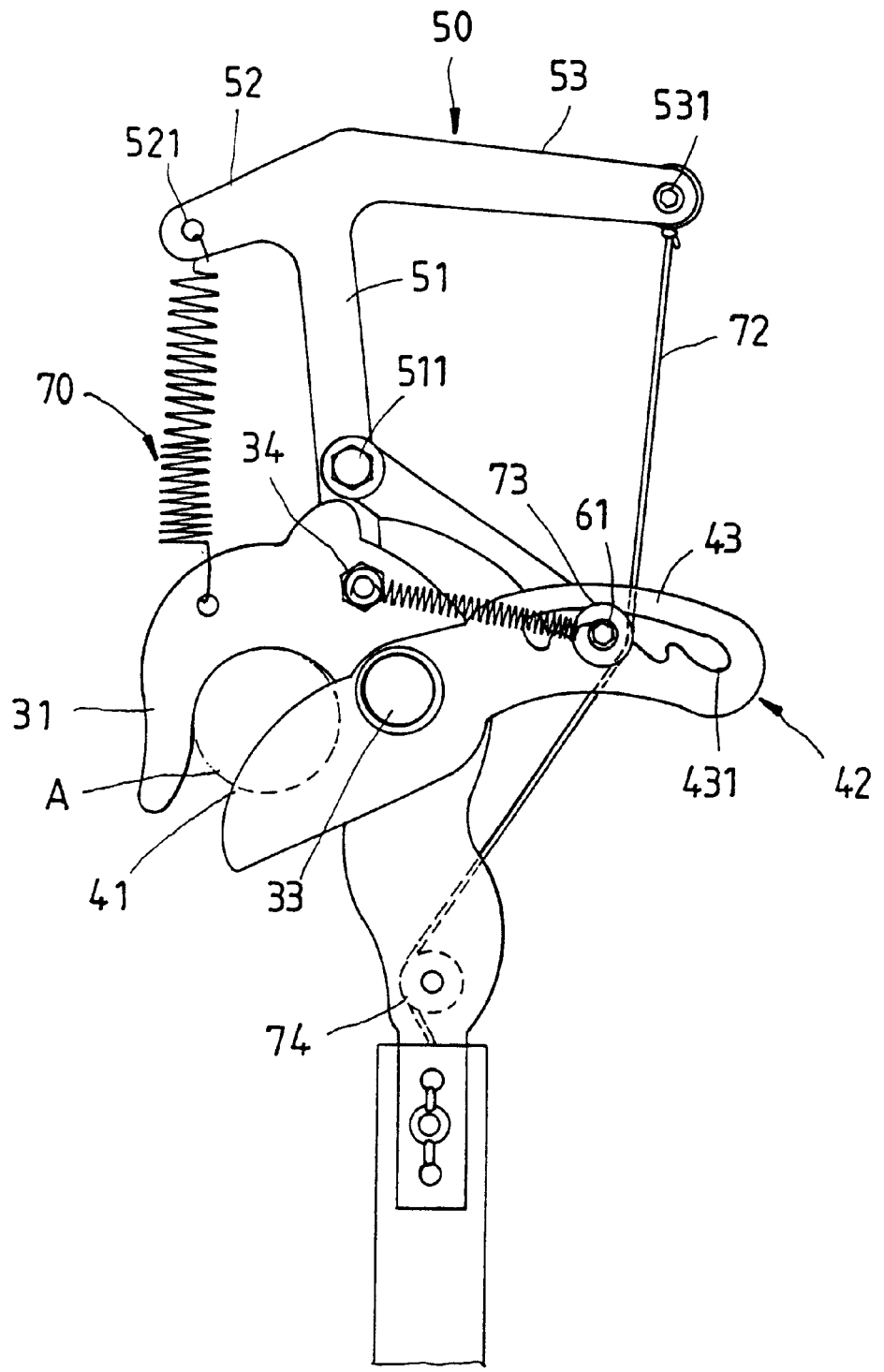
FIG. 5 shows still another schematic view of the present invention at work.

In operation, the two handles 24 are moved away from each other such that the movable tool 40 and the fixed tool 30 form an angle in which a tree twig "A" is received. The two handles 24 are then forced to move toward each other to activate the force transmission member 23 to pull the pull cord 72, thereby causing the second support arm 53 of the rocking arm 50 to be exerted on by the force so as to swivel downward on the pivot 34. As a result, the movable tool 40 is forced to swivel clockwise. In the meantime, the connection rod 60 is actuated by the rocking arm 50 such that the spindle 61 of the connection rod 60 is caused to move upwards in the slide slot 43 of the movable tool 40, and that the spindle 61 is retained in the arcuate groove 431 of the slide slot 43. The blade 41 of the movable tool 40 has now already cut into the tree twig "A". Any further cut into the tree twig "A" by the blade 41 calls for additional force. For this reason, the two handles 24 are let go to loosen up the pull cord 72, so as to allow the rocking arm 50 and the connection rod 60 to remain at their initial positions. The two handles 24 are once again exerted on by force such that the pull cord 72 is pulled, and that the second support arm 53 of the rocking arm 50 is once again caused to swivel downwards, thereby causing the spindle 61 of the connection rod 60 to be retained in the next arcuate groove 431 of the slide slot 43. As a result, the blade 41 of the movable tool 40 has completed the cutting action for the second time. Any further cutting action may be carried out repeatedly by following the procedures described above, until such time when the tree twig "A" is severed, as shown in FIG. 4.

The present invention is characterized in design in that the rocking arm 50 is caused to swivel at the time when the two handles 24 are moved away from each other, thereby causing the spindle 61 of the connection rod 60 to slide along the slide slot 43 to be retained in one of the arcuate grooves 431 of the slide slot 43, so as to bring about the cutting action by the blade 41 of the movable tool 40. When the cutting action is repeated, the blade 41 always remains at its initial cutting position. In addition, the present invention is provided with the spring 62 which is connected at one end thereof with the spindle 61 and at other end thereof with the second pivot 34 of the fixed tool 30. The spring 62 serves to facilitate the displacing of the connection rod 60 and the spindle 61 such that the spindle 61 can slide smoothly along the slide slot 43 of the movable tool 40, so as to be retained in one of the arcuate grooves 431 of the slide slot 43.

Moreover, the present invention is provided with the strap 25 to facilitate the carrying of the tree pruner of the present invention on the back of a worker while the worker is doing the pruning work with both hands exerting a force on the two handles 24. In other words, the tree pruner of the present invention makes the pruning job easy and efficient.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A tree pruner comprising:
    a support rod of a length and provided at one end thereof with two handles fastened therewith such that said two handles are opposite to each other;
    a fixed tool fastened at a lower end thereof with other end of said support rod, and provided at an upper end thereof with a blade;
    a movable tool fastening pivotally with said fixed tool, and provided at an upper end thereof with a blade and at a lower end thereof with an action portion having a slide slot, said slide slot of said action portion provided in a side wall thereof with a plurality of arcuate grooves;
    a rocking arm fastened pivotally at a bottom end thereof with said fixed tool and provided at a top end thereof with a first support arm extending therefrom and a second support arm extending therefrom;
    a connection rod fastened pivotally at one end thereof with the midsegment of said rocking arm such that the other end of said connection rod is pivoted in said slide slot of said action portion of said movable tool;
    a tensile spring fastened at one end thereof with said fixed tool and at other end thereof with one of two support arms of said rocking arm; and
    a pull cord connected with said handles via one of two support arms of said rocking arm such that said pull cord is pulled at the time when said two handles are exerted on by an external force, thereby actuating said connection rod to cause said movable tool to turn so as to execute an action of severing a tree twig held between said fixed tool and said movable tool.

2. The tree pruner as defined in claim 1, wherein said support rod is formed of an outer tube having an axial hole, and an inner tube received in said axial hole of said outer tube such that said inner tube can be extracted from and retracted into said outer tube, said inner tube having an inner hole provided therein with a force transmission member which is fastened at one end thereof with said pull cord, and at other end thereof with said handles.

3. The tree pruner as defined in claim 1, wherein said connection rod is provided at one end thereof with a spindle fastened pivotally therewith such that said spindle is movably disposed in said slide slot of said action portion of said movable tool, and that said spindle can be retained in any one of said arcuate grooves of said slide slot.

4. The tree pruner as defined in claim 3, wherein said spindle is provided at one end thereof with a first pulley; wherein bottom end of said fixed tool and fastening portion of said support rod are provided with a second pulley; and wherein said pull cord is wound on said first pulley and said second pulley via one of two support arms of said rocking arm and is then connected with said force transmission member.

5. The tree pruner as defined in claim 1, wherein a pivoting portion of said fixed tool and said rocking arm is fastened with one end of a spring, with other end of said spring being fastened with a pivoting portion of said movable tool and said connection rod.

6. The tree pruner as defined in claim 1, wherein said support rod is provided in a midsegment thereof with a strap to facilitate the carrying of the tree pruner on the back of a worker.

7. The tree pruner as defined in claim 1, wherein said two handles have a predetermined length.

* * * * *